United States Patent
Nakano et al.

(10) Patent No.: US 10,250,124 B2
(45) Date of Patent: Apr. 2, 2019

(54) POWER CONVERTER FOR CONTROLLING SWITCHING ELEMENTS DURING REGENERATIVE CONTROL OF AN INVERTER

(71) Applicant: Mitsubishi Electric Corporation, Chiyoda-ku (JP)

(72) Inventors: Kosuke Nakano, Chiyoda-ku (JP); Takuya Sakai, Chiyoda-ku (JP); Hiroyasu Iwabuki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 78 days.

(21) Appl. No.: 15/524,356

(22) PCT Filed: Jan. 22, 2016

(86) PCT No.: PCT/JP2016/051791
§ 371 (c)(1),
(2) Date: May 4, 2017

(87) PCT Pub. No.: WO2016/121632
PCT Pub. Date: Aug. 4, 2016

(65) Prior Publication Data
US 2018/0278144 A1 Sep. 27, 2018

(30) Foreign Application Priority Data

Jan. 29, 2015 (JP) ................................. 2015-014877

(51) Int. Cl.
| | |
|---|---|
| *H02M 7/797* | (2006.01) |
| *H02P 3/20* | (2006.01) |
| *H02M 1/32* | (2007.01) |
| *H02P 29/68* | (2016.01) |

(Continued)

(52) U.S. Cl.
CPC ............. *H02M 1/32* (2013.01); *H02M 7/797* (2013.01); *H02P 3/20* (2013.01); *H02P 29/68* (2016.02);
(Continued)

(58) Field of Classification Search
CPC .... H02M 7/66–7/797; H02P 3/14; H02P 3/20
See application file for complete search history.

(56) References Cited

U.S. PATENT DOCUMENTS

| | | | | |
|---|---|---|---|---|
| 2002/0158513 | A1* | 10/2002 | Amano | ............... F02N 11/0866 307/10.6 |
| 2004/0008530 | A1* | 1/2004 | Kitahata | ............... H02M 5/458 363/131 |
| 2014/0092655 | A1* | 4/2014 | Igarashi | .................. B60L 3/003 363/56.03 |

FOREIGN PATENT DOCUMENTS

| | | |
|---|---|---|
| JP | 2004-15892 A | 1/2004 |
| JP | 2006-166504 A | 6/2006 |

(Continued)

OTHER PUBLICATIONS

C. L. Fortescue, "Method of Symmetrical Co-Ordinates Applied to the Solution of Polyphase Networks," in Transactions of the American Institute of Electrical Engineers, vol. XXXVII, No. 2, pp. 1027-1140, Jul. 1918.*

(Continued)

*Primary Examiner* — Gary L Laxton
*Assistant Examiner* — Peter M Novak
(74) *Attorney, Agent, or Firm* — Oblon, McClelland, Maier & Neustadt, L.L.P.

(57) ABSTRACT

During regenerative control of an inverter circuit, when a path between a DC power supply and a smoothing capacitor is in a disconnection state, a control circuit of a power conversion device performs control while switching between first control in which upper switching elements (Continued)

within the inverter circuit are turned on and all lower switching elements are turned off and second control in which the lower switching elements are turned on and all the upper switching elements are turned off, every predetermined switching period.

18 Claims, 10 Drawing Sheets

(51) Int. Cl.
 *H02P 3/14* (2006.01)
 *H02P 3/22* (2006.01)
(52) U.S. Cl.
 CPC .... *B60L 2240/36* (2013.01); *H02M 2001/322* (2013.01); *H02P 3/14* (2013.01); *H02P 3/22* (2013.01); *Y02T 10/642* (2013.01)

(56) References Cited

FOREIGN PATENT DOCUMENTS

| | | |
|---|---|---|
| JP | 2008-13119 A | 1/2008 |
| JP | 2008-206329 A | 9/2008 |
| JP | 2013-42611 A | 2/2013 |
| JP | 2013-55822 A | 3/2013 |
| WO | WO 2012/077187 A1 | 6/2012 |

OTHER PUBLICATIONS

A. Amberg, A. Rangel, Tutorial on Symmetrical Components Part 2, May 2014, [online] Available: http://www.selinc.com.*
International Search Report dated Apr. 19, 2016 in PCT/JP2016/051791 filed Jan. 22, 2016.

* cited by examiner

FIG. 4

| UPPER LIMIT TEMPERATURE VALUE Tmax | 130°C |
|---|---|
| SWITCHING PERIOD Δt | 10 μs |

FIG. 6

UPPER LIMIT TEMPERATURE VALUE Tmax=130°C (a)

| Ia | 100A | 120A | 140A | 160A |
|---|---|---|---|---|
| SWITCHING PERIOD Δt | 11.5μs | 10.5μs | 9.5μs | 8.5μs |

(b)

| Ta | 20°C | 30°C | 40°C | 50°C |
|---|---|---|---|---|
| SWITCHING PERIOD Δt | 10μs | 9μs | 8μs | 7μs |

(c)

| N | 3000rpm | 3500rpm | 4000rpm | 4500rpm |
|---|---|---|---|---|
| SWITCHING PERIOD Δt | 6μs | 6.5μs | 7μs | 7.5μs |

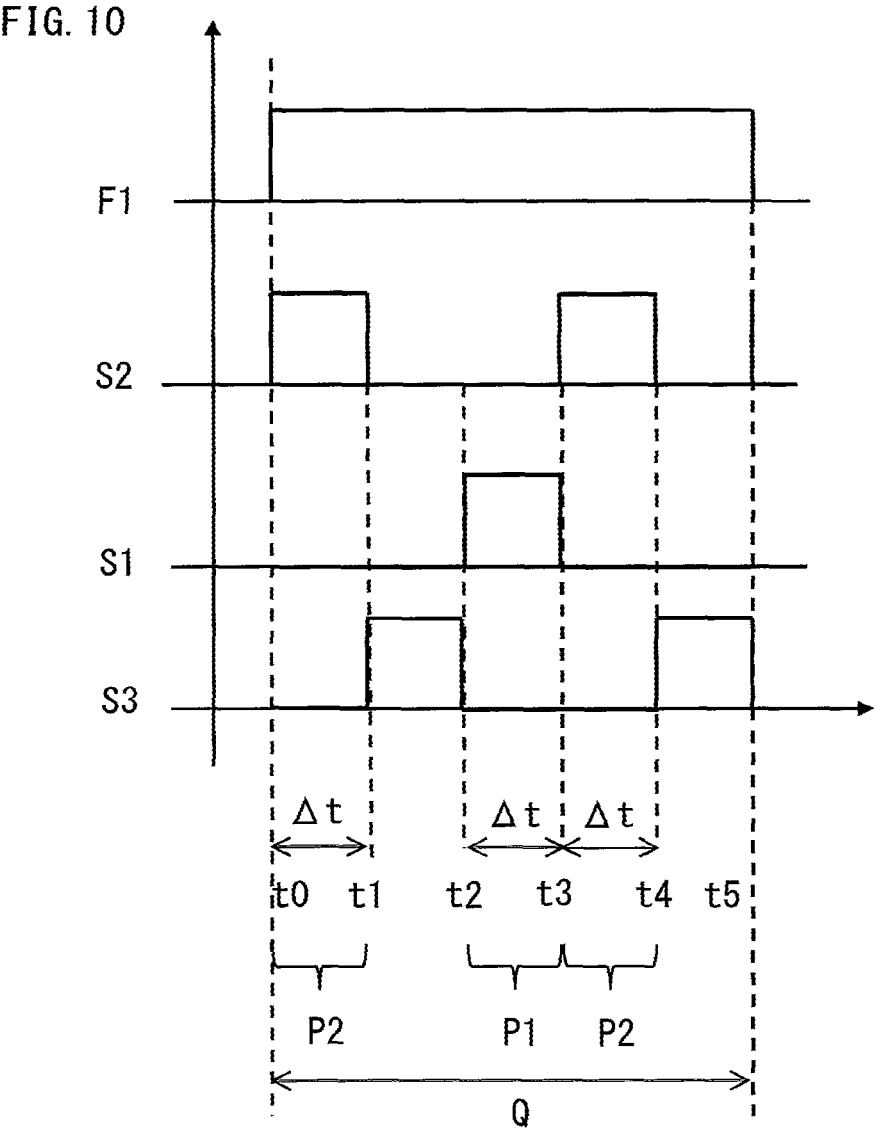

POWER CONVERTER FOR CONTROLLING SWITCHING ELEMENTS DURING REGENERATIVE CONTROL OF AN INVERTER

TECHNICAL FIELD

The present invention relates to a power converter including an inverter that changes a DC power input power to an AC power output, and particularly relates to regenerative control of the inverter.

BACKGROUND ART

In electric vehicles, such as a hybrid or electric car, regenerative energy is stored into a battery via a power converter including an inverter. This regenerative power can be reused to increase the effectiveness of the vehicle. However, during regenerative control, when a problem, such as a breakage in a cable connecting the battery to the power conversion device, arises so that the battery and the power conversion device come into a disconnection state, the regenerative power cannot be stored into the battery. For example, when this breakage occurs between the battery and a smoothing capacitor for the battery, all the regenerative power other than power consumed by the parasitic resistance of a wire and the ON resistance of each switching element of the inverter, is stored into the smoothing capacitor. When the regenerative power continues to be stored into the smoothing capacitor, the voltage of the smoothing capacitor increases to be an overvoltage, which decreases the reliability of the smoothing capacitor and each switching element of the inverter.

A conventional inverter stops a motor by turning on all lower switching elements, connected to the negative side of a DC power supply, of pairs of switching elements for respective phases of the motor. Accordingly, the respective phases of the motor are short-circuited to each other, and energy that has driven the motor so far is electrically consumed by a load such as a coil of the motor (see, for example, Patent Document 1).

A conventional power conversion device is disclosed which inhibits an increase in voltage of a DC power supply line during regeneration operation by the following method.

When an overvoltage of the DC power supply line is detected, a three-phase short-circuit is caused to occur. Because of the three-phase short-circuit, a current flows back between a motor and semiconductor switching elements, so that an increase in voltage of the DC power supply line can be inhibited. In the three-phase short-circuit, semiconductor switching elements of an upper arm or semiconductor switching elements of a lower arm are turned on for causing the current to flow back. Thus, the semiconductor switching elements that are turned on generate heat. In order to prevent occurrence of a breakdown of the semiconductor switching elements due to heat, the arm in which the three-phase short-circuit occurs is switched as appropriate. The arm in which the three-phase short-circuit is caused to occur may be switched on the basis of outputs of temperature sensors, which are provided at the upper arm side and the lower arm side of an inverter portion, respectively, such that the temperature of the semiconductor switching elements at the upper arm side are substantially equal to that at the lower arm side (see, for example, Patent Document 2).

CITATION LIST

Patent Document

Patent Document 1: Japanese Laid-Open Patent Publication No. 2006-166504 (page 4, paragraphs [0012] and [0013], FIG. 2)

Patent Document 2: International Publication No. WO2012/077187 (page 20, paragraphs [0062] to [0066], page 25, [0086], FIG. 4, FIG. 6)

SUMMARY OF THE INVENTION

Problems to be Solved by the Invention

In the conventional power conversion device disclosed in Patent Document 1 described above, in short-circuiting the respective phases of the motor to each other, only the lower switching elements for all the phases connected to the lower potential side of the DC power supply are turned on. Accordingly, a regenerative current flows back between the motor and an inverter circuit, and regenerative power is consumed, whereby an increase in voltage of a smoothing capacitor is inhibited. However, since only the lower switching elements are turned on to cause the regenerative current to flow back, the temperature of the lower switching elements rises, due to conduction loss at the time of switching, to decrease the reliability thereof.

In the three-phase power conversion device disclosed in Patent Document 2, arm switching control is performed such that the temperature of the switching elements at the upper arm side is substantially equal to that at the lower arm side. However, the upper and lower arms are present at each phase, and the temperature of the switching elements may be different between each phase depending on conditions such as the operation mode of the power conversion device, a cooling condition for each arm, the number of parallel-connected switching elements in each arm, variation of the characteristics of each switching element, and the position at which each switching element is mounted.

In addition, even within the same arm, a condition that influences the temperature of each switching element may be different between each switching element, and the temperatures of the respective switching elements do not necessarily become uniform.

Thus, it is difficult to accurately obtain the temperatures of the switching elements, so that it is difficult to appropriately perform switching control of the switching elements at the upper arm side and the lower arm side.

Therefore, there is a problem that a rise in temperature of the switching elements included in the power conversion device cannot be reliably inhibited.

The present invention has been made to solve the above-described problems, and an object of the present invention is to provide a power conversion device that is able to reliably inhibit a rise in temperature of each switching element, while inhibiting an increase in voltage of a smoothing capacitor, by appropriately controlling switching of switching elements of an arm at a high potential side and switching elements of an arm at a low potential side, even when a disconnection state between a DC power supply and the smoothing capacitor is caused during regenerative control of the power conversion device.

Solution to the Problems

A power conversion device according to the present invention includes: a smoothing capacitor connected between DC buses and smoothing DC power from a DC power supply; an inverter circuit including series units including upper switching elements connected to a high potential side of the DC buses and lower switching elements connected to a low potential side of the DC buses, the upper switching elements being connected in series with the lower switching elements, respectively, connection points between the upper switching elements and the lower switching elements being connected to respective phase AC input/output lines, the respective series units being connected in parallel between the DC buses, the inverter circuit converting the DC power to AC power and outputting the AC power; and a control circuit controlling power running and regeneration of the inverter circuit, wherein, during regenerative control of the inverter circuit, when a path between the DC power supply and the smoothing capacitor is in a disconnection state, the control circuit performs control while switching between first control in which all the upper switching elements are turned on and all the lower switching elements are turned off and second control in which all the lower switching element are turned on and all the upper switching elements are turned off, every predetermined switching period.

In addition, a power conversion device according to the present invention includes: a smoothing capacitor connected between DC buses and smoothing DC power from a DC power supply; an inverter circuit including series units including upper switching elements connected to a high potential side of the DC buses and lower switching elements connected to a low potential side of the DC buses, the upper switching elements being connected in series with the lower switching elements, respectively, connection points between the upper switching elements and the lower switching elements being connected to respective phase AC input/output lines, the respective series units being connected in parallel between the DC buses, the inverter circuit converting the DC power to AC power and outputting the AC power; and a control circuit controlling power running and regeneration of the inverter circuit, wherein, during regenerative control of the inverter circuit, when a path between the DC power supply and the smoothing capacitor is in a disconnection state, the control circuit performs control while switching between first control in which all the upper switching elements are turned on and all the lower switching elements are turned off and second control in which all the lower switching elements are turned on and all the upper switching elements are turned off, every determined switching period, and the control circuit determines the switching period in accordance with a current flowing through each phase AC input/output line.

Effect of the Invention

In the power conversion device according to the present invention, during regenerative control of the inverter circuit, even when a state where the DC power supply and the smoothing capacitor are disconnected from each other is caused, switching control of the upper switching elements at the high potential side and the lower switching elements at the low potential side can be appropriately performed, so that a rise in temperature of the switching elements is reliably inhibited while an increase in voltage of the smoothing capacitor is inhibited, and the reliability of the smoothing capacitor and the switching element can be improved to extend the life thereof.

BRIEF DESCRIPTION OF THE DRAWINGS

FIG. 4 is a diagram showing a configuration example of a data table within the control circuit according to Embodiment 1 of the present invention.

FIG. 6 is a diagram showing another configuration example of the data table within the control circuit according to Embodiment 1 of the present invention.

FIG. 10 is a schematic diagram showing signals for overvoltage inhibition control during regenerative control of a control circuit according to Embodiment 3 of the present invention

DESCRIPTION OF EMBODIMENTS

Embodiment 1

Hereinafter, a power conversion device 100 that is used for driving an electric motor of an electric vehicle will be described as a power conversion device according to Embodiment 1 of the present invention, with reference to the drawings.

Figure 1:
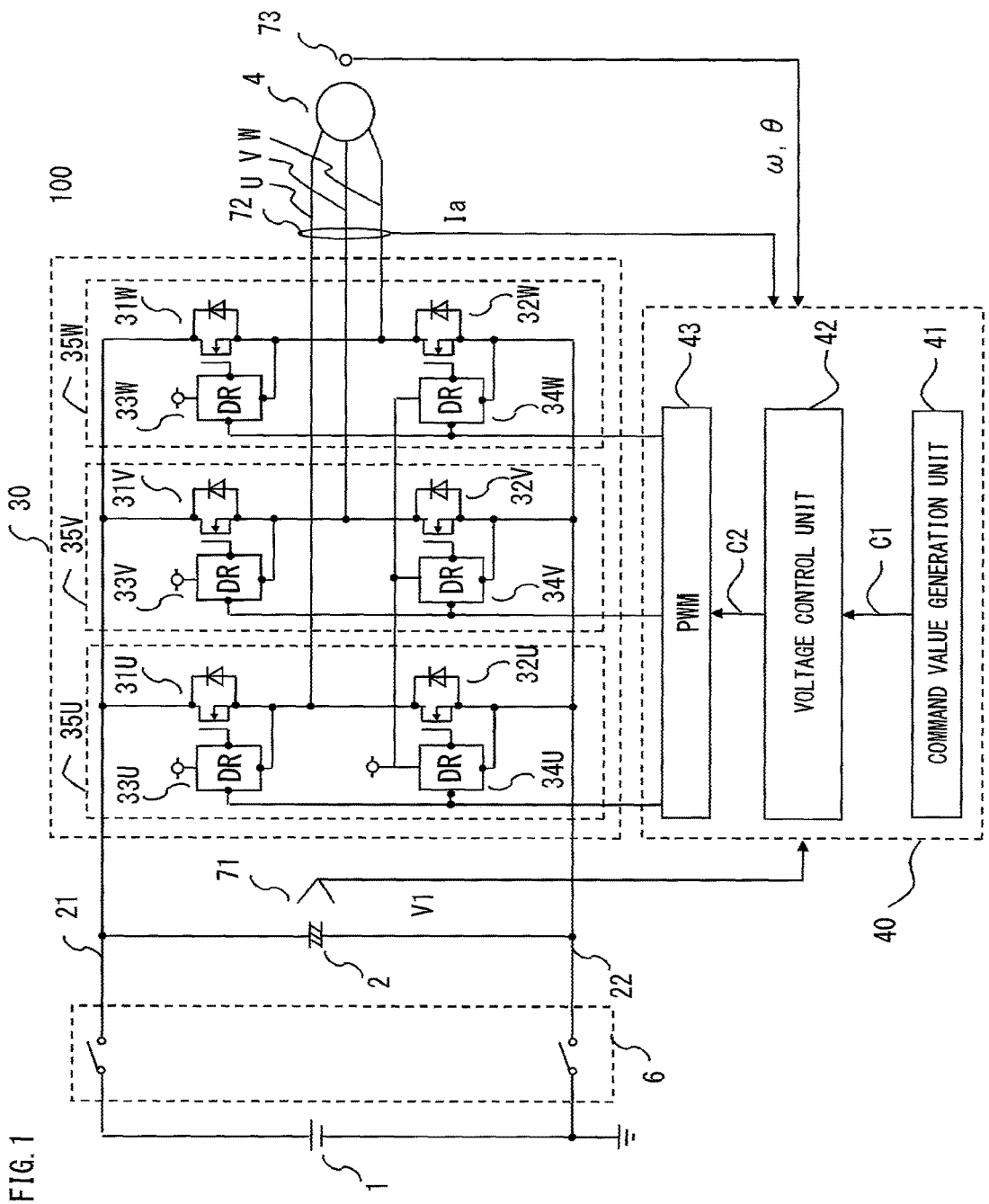
FIG. 1 is a schematic diagram showing the configuration of a power conversion device according to Embodiment 1 of the present invention.

FIG. 1 is a schematic diagram showing the configuration of the power conversion device 100 according to Embodiment 1 of the present invention.

The power conversion device 100 includes: an electric motor drive device 30 as an inverter circuit that is connected between a DC power supply 1 and an electric motor 4 used in an electric vehicle, and converts DC power from the DC power supply 1 to AC power and outputs the AC power to the electric motor 4; a smoothing capacitor 2 that smoothes the DC power from the DC power supply 1; and a control circuit 40 that controls power running and regeneration of the electric motor drive device 30.

The smoothing capacitor 2 is connected between a DC bus at a high potential side (hereinafter, referred to as bus 21) and a DC bus at a low potential side (hereinafter, referred to as bus 22) so as to be in parallel to the electric motor drive device 30, and is connected to positive and negative terminals of the DC power supply 1 via a relay 6. The relay 6 can mechanically connect and disconnect the electric motor drive device 30 and the DC power supply 1 to and from each other.

The electric motor drive device 30 includes series units 35U, 35V, and 35W respectively including: upper switching elements 31U, 31V, and 31W that are switching elements and connected to the bus 21; and lower switching elements 32U, 32V, and 32W that are switching elements and connected to the bus 22, the upper switching elements 31U, 31V, and 31W being connected in series with the lower switching elements 32U, 32V, and 32W, respectively.

Diodes are connected in antiparallel to the respective switching elements 31 (31U, 31V, 31W) and the respective switching elements 32 (32U, 32V, 32W).

Hereinafter, the upper switching elements 31 and the lower switching elements 32 are referred to merely as switching elements 31 and 32 when a description is given without distinguishing between the upper switching elements 31 and the lower switching elements 32.

The respective series units 35U, 35V, and 35W are connected in parallel between the bus 21 and the bus 22. Connection points between the upper switching elements 31U, 31V, and 31W and the lower switching elements 32U, 32V, and 32W of the respective series units 35U, 35V, and 35W are connected to phase AC input/output lines (U, V, W in the drawing) of a U phase, a V phase, and a W phase, respectively. The respective phases of the electric motor 4 are connected to the phase AC input/output lines of the U phase, V phase, and the W phase, respectively.

The electric motor drive device 30 further includes: high potential side drive circuits 33U, 33V, and 33W for driving the upper switching elements 31U, 31V, and 31W; and low potential side drive circuits 34U, 34V, and 34W for driving the lower switching elements 32U, 32V, and 32W. Each of the drive circuits 33U, 33V, 33W, 34U, 34V, and 34W is shown as DR.

In addition, three sensors, a voltage sensor 71, a current sensor 72, and a rotation sensor 73 for detecting the states of the electric motor drive device 30 and the electric motor 4, are provided.

The control circuit 40 detects a voltage V1 between the buses 21 and 22 on the basis of sensing information of the voltage sensor 71. The control circuit 40 detects an output current (a current flowing through each phase AC input/output line) Ia of the electric motor drive device 30 on the basis of sensing information of the current sensor 72. The control circuit 40 detects a speed $\omega$ and a magnetic pole position $\theta$ of the electric motor 4 on the basis of sensing information of the rotation sensor 73.

Figure 2:
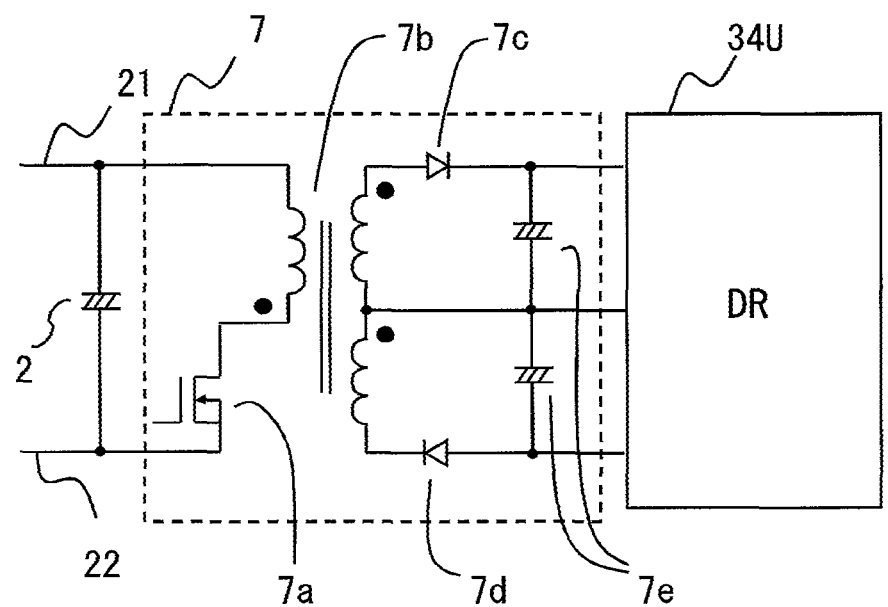
FIG. 2 is a circuit configuration diagram of an insulated power supply for driving switching elements according to Embodiment 1 of the present invention.

FIG. 2 is a circuit configuration diagram of an insulated power supply 7 for driving the switching elements 31 and 32 according to Embodiment 1 of the present invention.

As shown in FIG. 2, the insulated power supply 7 includes a switching element 7a, a transformer 7b, diodes 7c and 7d, and capacitors 7e. The insulated power supply 7 receives power between the buses 21 and 22 and generates drive power to be supplied to the high potential side drive circuits 33U, 33V, and 33W and the low potential side drive circuits 34U, 34V, and 34W. The insulated power supply 7 can vary a voltage to be generated, in accordance with an ON time of the switching element included therein and the turns ratio of the transformer included therein.

The control circuit 40 controls operation of the electric motor drive device 30 in order to control the rotation rate and the torque of the electric motor 4. The control circuit 40 includes a command value generation unit 41, a voltage control unit 42, and a PWM circuit 43. The command value generation unit 41 generates a command value C1 on the basis of information about a target rotation rate and a target torque for the electric motor 4 and control information of a driver. Then, the command value C1 is inputted to the voltage control unit 42. The voltage control unit 42 outputs a command value C2 for controlling an output voltage of the electric motor drive device 30, on the basis of: the command value C1; and the voltage V1 between the buses 21 and 22, the output current (the current in each phase AC input/output line) Ia, and the speed $\omega$ and the value of the magnetic pole position 19, which are sensed and detected by the respective sensors 71 to 73, respectively. The PWM circuit 43 generates drive signals through PWM control on the basis of the command value C2, and the generated drive signals are inputted to the high potential side drive circuits 33U, 33V, and 33W and the low potential side drive circuits 34U, 34V, and 34W.

The upper switching elements 31U, 31V, and 31W, which are disposed so as to correspond to the respective phases as described above, are driven by the high potential side drive circuits 33U, 33V, and 33W and perform switching operation between the bus 21 and the phase AC input/output lines of the U phase, the V phase, and the W phase. In addition, the lower switching elements 32U, 32V, and 32W are driven by the low potential side drive circuits 34U, 34V, and 34W and perform switching operation between the bus 22 and the phase AC input/output lines of the U phase, the V phase, and the W phase.

Next, regenerative control of the electric motor drive device 30 will be described.

When a regenerative brake operates, a rotation torque is transmitted from a wheel of the electric vehicle to the electric motor 4, and the electric motor 4 generates AC power (regenerative power) on the basis of the rotation torque transmitted thereto. At this time, the control circuit 40 performs regenerative control of the electric motor drive device 30 to regenerate the generated AC power.

When a path between the DC power supply 1 and the smoothing capacitor 2 is properly connected, the control circuit 40 turns off all the switching elements 31 and 32 of the electric motor drive device 30.

The present invention is not limited to the control in which all the switching elements 31 and 32 are turned off as described above. For example, synchronous rectification control may be performed in which switching of the switching elements 31 and 32 is performed in synchronization with conduction of the diodes. Accordingly, the AC power is converted by the electric motor drive device 30 to DC power, which is in turn stored into the DC power supply 1. The stored power is used again as running energy during power running operation of the electric motor drive device 30.

When the path between the DC power supply 1 and the smoothing capacitor 2 is in a disconnection state (e.g., when the relay 6 is in an open state, or in the case of a state where a cable to the DC power supply 1 is disconnected due to a certain reason), the control circuit 40 performs the following overvoltage inhibition control in order to inhibit an increase in voltage of the smoothing capacitor 2 due to regenerative power.

Figure 3:
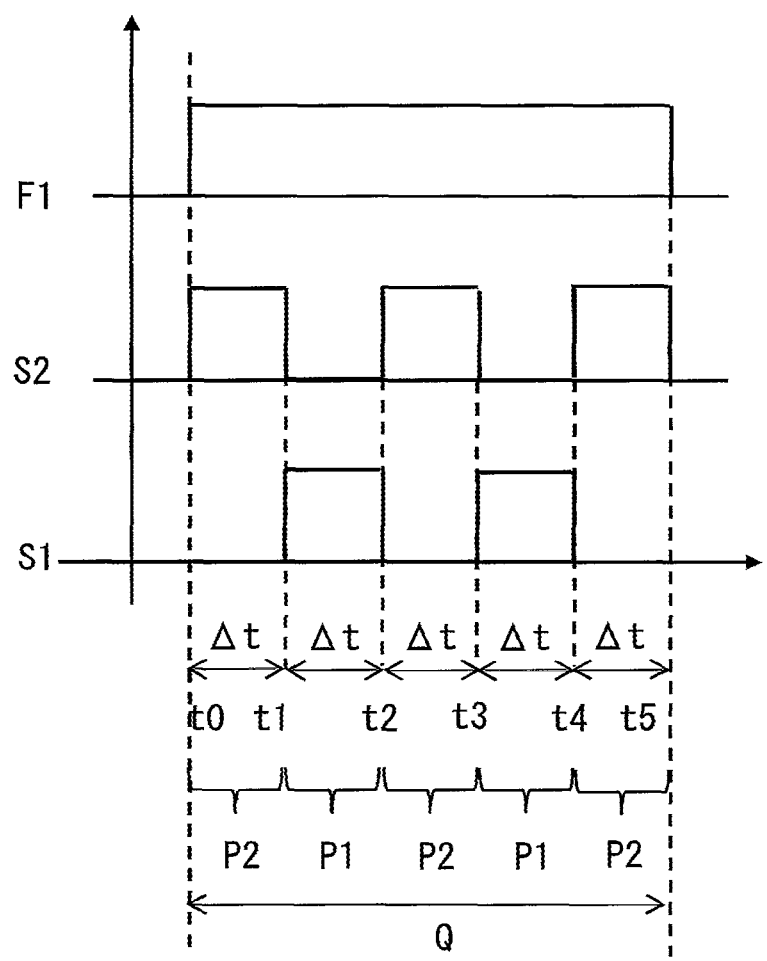
FIG. 3 is a schematic diagram showing an example of signals for overvoltage inhibition control during regenerative control of a control circuit according to Embodiment 1 of the present invention.

FIG. 3 is a schematic diagram showing signals for the overvoltage inhibition control during regenerative control of the control circuit 40 according to Embodiment 1 of the present invention. The horizontal axis indicates time, and Q indicates a period of the overvoltage inhibition control.

The drawing shows the relationship between: a Fail signal F1 that becomes Hi when the path between the DC power supply 1 and the smoothing capacitor 2 is in the disconnection state; and a drive signal S2 for the lower switching elements 32U, 32V, and 32W and a drive signal S1 for the upper switching elements 31U, 31V, and 31W which are outputted to the electric motor drive device 30 by the control circuit 40 during the overvoltage inhibition control.

During regenerative control of the electric motor drive device 30, when the Fail signal F1 becomes Hi at time to, the control circuit 40 starts the overvoltage inhibition control.

The Fail signal F1 is outputted while it is determined whether the path between the DC power supply 1 and the smoothing capacitor 2 is in the disconnection state, by using, for example, an opening/closing signal for the relay 6, and information about the voltage and the current of the power conversion device 100 which is obtained from the voltage sensor 71, the current sensor 72, etc.

In the overvoltage inhibition control, the control circuit 40 performs second control P2 having a zero vector period in which all the lower switching elements 32U, 32V, and 32W of the U phase, the V phase, and the W phase are turned on and all the upper switching elements 31U, 31V, and 31W are turned off.

When the lower switching elements 32U, 32V, and 32W of all the phases are ON, each phase of an armature winding of the electric motor 4 is short-circuited, and a regenerative current flows back between the electric motor drive device 30 and the electric motor 4. Then, regenerative power is consumed by the ON resistance of each of the lower switching elements 32U, 32V, and 32W turned on, a load of the armature winding of the electric motor 4, and the parasitic resistance of a wire.

At time t1 at which a period $\Delta t$ elapses from time to, the control circuit 40 switches to first control P1 having a zero vector period in which all the upper switching elements 31U, 31V, and 31W of the U phase, the V phase, and the W phase are turned on and all the lower switching elements 32U, 32V, and 32W are turned off.

Similarly to during the second control P2, regenerative power is consumed by the ON resistances of the upper switching elements 31U, 31V, and 32W turned on, the load of the armature winding of the electric motor 4, and the parasitic resistance of the wire.

At time t2 at which the period $\Delta t$ elapses from time t1, the control circuit 40 switches to the second control P2. At time t3 at which the period $\Delta t$ elapses from time t2, the control circuit 40 switches to the first control P1.

The switching control between the first control P1 and the second control P2 every period $\Delta t$ by the control circuit 40 is repeated until the Fail signal F1 becomes Low.

As shown in FIG. 3, the period $\Delta t$ having a fixed length is always used as a switching period.

In the period of the second control P2 from time t0 to time t1, the regenerative current flows through the lower switching elements 32U, 32V, and 32W. Thus, the temperatures of the lower switching elements 32U, 32V, and 32W rise. On the other hand, the regenerative current does not flow through the upper switching elements 31U, 31V, and 31W turned off. Thus, the temperatures of the upper switching elements 31U, 31V, and 31W fall.

In the period of the first control P1 from time t1 to time t2, the regenerative current flows through the upper switching elements 31U, 31V, and 31W. Thus, the temperatures of the upper switching elements 31U, 31V, and 31W rise. On the other hand, the regenerative current does not flow through the lower switching elements 32U, 32V, and 32W turned off. Thus, the temperatures of the lower switching elements 32U, 32V, and 32W fall.

In this manner, the control circuit 40 performs control while switching between the second control P2, in which the lower switching elements 32U, 32V, and 32W are turned on, and the first control P1, in which the upper switching elements 31U, 31V, and 31W are turned on, every period $\Delta t$. Thus, a cooling period can be ensured in which the regenerative current does not flow through the switching elements 31 or 32 that are turned off. Accordingly, an rise in temperature of the switching elements 31 and 32 can be inhibited.

Furthermore, by switching between the upper switching elements 31U, 31V, and 32W and the lower switching elements 32U, 32V, and 32W, switching loss occurs at the time of switching. Because of the switching loss, it is possible to more efficiently consume the regenerative power.

In the present embodiment, in the overvoltage inhibition control, the second control P2 is performed earlier, and then the first control P1 is performed. However, this order may be inverted.

Hereinafter the switching period $\Delta t$ will be described.

FIG. 4 is a diagram showing a configuration example of a data table within the control circuit 40 according to Embodiment 1 of the present invention.

An upper limit temperature value Tmax shown in FIG. 4 indicates an upper limit temperature value (130° C. in this case) for a PN junction between a P-type semiconductor region and an N-type semiconductor region within each of the switching elements 31 and 32, which are semiconductor elements.

In the data table, a period length (10 μs in this case) of the switching period $\Delta t$ which is determined in advance such that the temperature of the PN junction is equal to or lower than the upper limit temperature value Tmax, is held.

The value (10 μs) of the switching period $\Delta t$ is determined in advance on the basis of conditions J1 such as the element characteristics of the respective switching elements 31 and 32, the operation mode of the power conversion device 100, and the position at which each of the switching elements 31 and 32 is mounted.

The conditions J1 can be accurately obtained before operation of the power conversion device 100. Then, on the basis of the conditions J1, the switching period $\Delta t$ is determined such that the temperatures of all the switching elements 31 and 32 included in the power conversion device 100 are equal to or lower than the upper limit temperature value Tmax.

The control circuit 40 performs control while switching between the first control P1 and the second control P2 every 10 μs by using the switching period $\Delta t$ which is 10 μs determined in advance as described above.

The case where the thermal resistances of the switching elements 31 and 32 are used as a specific example of the element characteristics of the respective switching elements 31 and 32, which are the conditions J1, will be described.

By using the thermal resistances of the switching elements 31 and 32, a temperature rise value $\Delta Tr$ of the switching elements 31 and 32 can be calculated in advance. The switching period $\Delta t$ is determined such that heat corresponding to the calculated temperature rise value $\Delta Tr$ is radiated and the temperatures of the switching elements 31 and 32 become equal to or lower than the upper limit temperature value Tmax.

In addition, in order to calculate a more accurate temperature rise value $\Delta Tr$, the thermal capacities of the switching elements 31 and 32 may be used in addition to the thermal resistances of the switching elements 31 and 32.

Moreover, in order to calculate the temperature rise value $\Delta Tr$, the thermal resistance of a heat radiating portion thermally connected to the switching elements 31 and 32 may be used in addition to the thermal resistances of the switching elements 31 and 32. Hereinafter, the heat radiating portion will be described with reference to the drawing.

Figure 5:
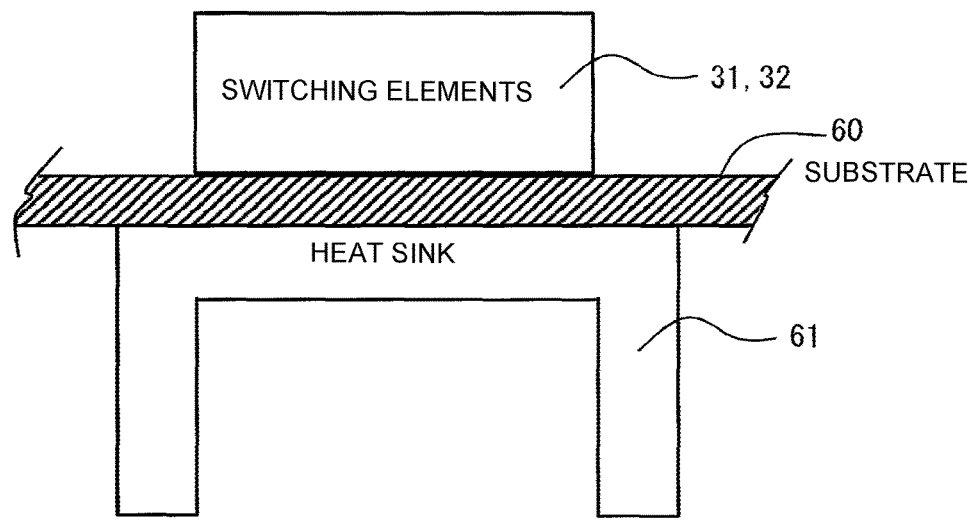
FIG. 5 is a cross-sectional view showing a state where the switching elements according to Embodiment 1 of the present invention are mounted on a substrate.

FIG. 5 is a cross-sectional view showing a state where the switching elements 31 and 32 according to Embodiment 1 of the present invention are mounted on a substrate 60.

As shown in the drawing, a heat sink 61 is mounted as the heat radiating portion on a back surface of the substrate 60 having a front surface on which the switching elements 31 and 32 are mounted. In this configuration, heat generated by the switching elements 31 and 32 is transmitted to the heat sink 61 via the substrate 60 as a heat conduction path.

In this case, it is possible to calculate a more accurate temperature rise value ΔTr by using the thermal resistances of the switching elements 31 and 32, the thermal resistance of the substrate 60, and the thermal resistance of the heat sink 61.

Hereinafter, switching control between the first control P1 and the second control P2 by using a data table having a configuration different from that in FIG. 4, will be described.

FIG. 6 is a diagram showing another configuration example of the data table within the control circuit 40 according to Embodiment 1 of the present invention.

In each data table shown in FIG. 6, a plurality of period lengths are held for the switching period Δt. Similarly to the switching period Δt shown in FIG. 4, these switching periods Δt are determined in advance on the basis of the conditions J1 such that the temperature of the PN junction in each of the switching elements 31 and 32 is equal to or lower than the upper limit temperature value Tmax.

Furthermore, the period lengths of these switching periods Δt are determined for respective conditions J2 shown as Ia, Ta, and N in the drawing.

The conditions J2 are conditions that are obtained from the sensors and the like during operation of the power conversion device 100 and influence the temperatures of the switching elements 31 and 32.

Specifically, Ia shown as the condition J2 in FIG. 6(a) is a value of the current flowing through each phase AC input/output line which is obtained by the current sensor 72; Ta shown as the condition J2 in FIG. 6(b) is an ambient temperature Ta of the switching elements 31 and 32; and N shown as the condition J2 in FIG. 6(c) is a cooling condition for a fan for cooling the switching elements 31 and 32 (here, a rotation rate N of the fan).

As described above, the switching periods Δt corresponding to the values of these conditions J2 are determined in advance such that the temperatures of all the switching elements 31 and 32 included in the power conversion device 100 are equal to or lower than the upper limit temperature value Tmax.

Hereinafter, control of the control circuit 40 by using the conditions J2 will be described.

During operation of the power conversion device 100, when the Fail signal F1 becomes Hi and the control circuit 40 determines that the path between the DC power supply 1 and the smoothing capacitor 2 is in the disconnection state, the control circuit 40 obtains the above conditions J2.

Here, the control circuit 40 does not need to obtain all of the three conditions J2 (the current Ia, the ambient temperature Ta, and the fan rotation rate N), and may obtain at least one of the conditions J2.

Next, the control circuit 40 selects one period length from the plurality of period lengths for the switching period Δt in accordance with the obtained condition J2.

Specifically, it is assumed that the current Ia flowing through each phase AC input/output line is obtained as the condition J2, and the value of the current Ia is 120 A. In this case, the control circuit 40 selects a period length of 10.5 μs which is determined in advance so as to be associated with the current Ia of 120 A, from the data table shown in FIG. 6(a).

Next, the control circuit 40 performs control while switching between the first control P1 and the second control P2 every 10.5 μs by using the period length of 10.5 μs for the switching period Δt.

When the ambient temperature Ta is obtained as the condition J2, the control circuit 40 selects the period length for the switching period Δt that is determined in advance so as to be associated with the value of the obtained ambient temperature Ta, from the data table shown in FIG. 6(b).

When the fan rotation rate N is obtained as the condition J2, the control circuit 40 selects the period length for the switching period Δt that is determined in advance so as to be associated with the value of the obtained fan rotation rate N, from the data table shown in FIG. 6(c).

The present invention is not limited to selection of a period length based on each one of the conditions J2 as described above. For example, both values of a plurality of the conditions J2 (e.g., the current Ia and the ambient temperature Ta) may be obtained simultaneously, and a period length may be selected on the basis of a table (not shown) in which a period length associated with both values is held.

As described above, the control circuit 40 selects one period length from a plurality of period lengths in accordance with at least one value of the obtained conditions J2.

Hereinafter, switching control between the first control P1 and the second control P2 which is different from the control described with reference to FIGS. 3, 4, and 6, will be described.

Figure 7:
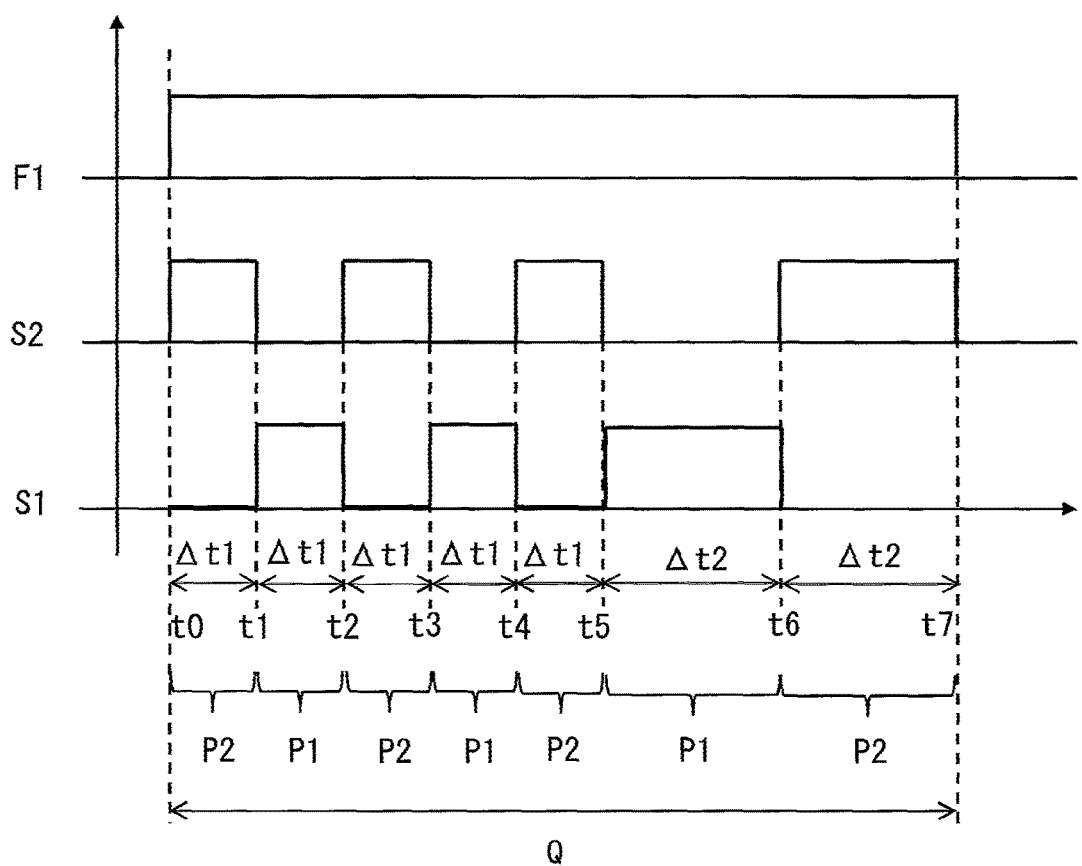
FIG. 7 is a schematic diagram showing another example of the signals for the overvoltage inhibition control during regenerative control of the control circuit according to Embodiment 1 of the present invention.

FIG. 7 is a schematic diagram showing control, different from that shown in FIG. 3, in the overvoltage inhibition control during regenerative control of the control circuit 40 according to Embodiment 1 of the present invention.

In the switching control described with reference to FIG. 3, the fixed switching period Δt is always used regardless of the elapsed time of the switching control between the first control P1 and the second control P2.

In the switching control shown in FIG. 7, a switching period Δt1 used from time to, at which the switching control between the first control P1 and the second control P2 is started, to time t5 is different from a switching period Δt2 used from time t5 to time t7.

It is possible to use the predetermined switching periods Δt1 and Δt2 in accordance with the elapsed time of the switching control between the first control P1 and the second control P2 as described above.

In the present embodiment, an n-type MOSFET (Metal-Oxide-Semiconductor Field-Effect-Transistor) is shown as each switching element of the electric motor drive device 30, but each switching element of the electric motor drive device 30 is not limited thereto. Each switching element only needs to have a switching function, and a bipolar transistor or an IGBT (Insulated Gate Bipolar Transistor) may be used. A MOSFET, which is a unipolar device, generally has a tendency that the ON resistance thereof increases in accordance with the temperature thereof. Meanwhile, an IGBT, which is a bipolar device, is said to generally have a less increase in a saturated voltage between the collector and the emitter thereof with respect to the temperature thereof. Each switching element may be selected in consideration of the characteristics of these switching elements 31 and 32 such that a braking force required by the driver of the electric vehicle is obtained.

The diodes connected in antiparallel to the switching elements 31 and 32 are shown as the body diodes of MOSFETs in the case of using the MOSFETs, but are not limited thereto. Each of the diodes only needs to have a function to allow a current to flow in the reverse direction, and an SBD (Schottky Barrier Diode) or a PN junction diode may be used. In addition, synchronous rectification of a MOSFET may be used instead of using the diode.

For each of these switching elements 31 and 32, it is possible to use a wide bandgap semiconductor as well as a S1 semiconductor. Examples of the wide bandgap semiconductor include gallium nitride and diamond as well as silicon carbide. The wide bandgap semiconductor is capable of operating at high temperature, so that a cooling system such as a heat sink can be simplified, and it is possible to reduce the size of the device.

In the present embodiment, the example in which the relay 6 is used has been described, but the present invention is not limited thereto, and the relay 6 may not be provided depending on a circuit configuration.

The configuration of the voltage sensor 71, the current sensor 72, and the rotation sensor 73 is an example. Depending on the electric motor 4 or a load connected to the electric motor 4, these sensors may be unnecessary, or information sensed by these sensors may not be used. Alternatively, sensing of more information is needed in some cases, and thus the sensor configuration may be changed as appropriate in such a case.

The DC power supply 1 for the electric motor drive device 30 is composed of, for example, a NiMH (nickel-metal hydride) battery or a Li-ion (lithium-ion) battery. In addition, an AC power supply may be rectified and used as a DC power supply.

According to the power conversion device 100 of the present embodiment configured as described above, when the disconnection state is caused between the DC power supply 1 and the smoothing capacitor 2 during regenerative control, the regenerative current is caused to flow back between the electric motor drive device 30 and the electric motor 4. Accordingly, control can be performed such that regenerative power is not stored into the smoothing capacitor 2. Therefore, an increase in voltage of the smoothing capacitor 2 can be inhibited, and a decrease in reliability of the smoothing capacitor and the switching elements 31 and 32 due to an overvoltage of the smoothing capacitor 2 can be prevented.

Furthermore, in causing the regenerative current to flow back between the electric motor drive device 30 and the electric motor 4, control is performed while switching between the first control P1 and the second control P2 every predetermined switching period Δt. Thus, a cooling period can be ensured in which, while the regenerative power is consumed by the switching elements 31 or 32 that are turned on, the regenerative current is not caused to flow through the switching elements 31 or 32 that are turned off. Accordingly, the switching elements 31 and 32 whose temperatures have risen can be cooled, and a rise in temperature of the switching elements 31 and 32 can be inhibited, thereby improving the reliability. As a result, a power conversion device having high reliability and long life can be provided.

Moreover, it is possible to use small-size switching elements 31 and 32 and a small-size smoothing capacitor 2 having a small capacity, so that it is possible to reduce the size of the device configuration.

Furthermore, the switching period is not determined on the basis of the temperature of each presently operating switching element which is hard to accurately detect, as in the conventional art, and the control circuit 40 uses the predetermined switching period Δt. The switching period Δt is determined in advance on the basis of various conditions J1 that influence the temperatures of the switching elements 31 and 32. The conditions J1 are conditions, such as the element characteristics of the switching elements 31 and 32, which can be accurately obtained before operation of the power conversion device 100. Thus, it is possible to use a proper switching period Δt based on the conditions that can be accurately obtained. Accordingly, the temperatures of the switching elements 31 and 32 can be reliably reduced to be equal to or lower than the upper limit temperature value Tmax.

In addition, during operation of the power conversion device 100, the control circuit 40 obtains the condition J2, such as the value of the current Ia flowing through each phase AC input/output line, at the time point when the Fail signal F1 becomes Hi, and selects a period length for the switching period Δt on the basis of the condition J2.

The condition J2 such as the current Ia flowing through each phase AC input/output line can be accurately obtained even during operation of the power conversion device 100. Moreover, the condition J2 indicates the state of the power conversion device 100 immediately before the switching control between the first control P1 and the second control P2 is performed.

Accordingly, it is possible to select an optimum period length from the plurality of predetermined period lengths on the basis of the condition J2 which is accurate and further corresponds to the latest operating state of the power conversion device 100. Therefore, a rise in temperature of the switching elements 31 and 32 can be inhibited with high accuracy.

In addition, the switching period Δt is not determined while the temperature of the upper switching elements 31 and the temperature of the lower switching elements 32 are compared to each other as in the conventional art. Thus, there is no possibility of delay of processing of the control circuit 40 due to comparison control. Accordingly, the control circuit 40 can quickly perform the switching control between the first control P1 and the second control P2.

Since the switching control between the first control P1 and the second control P2 which are determined in advance as described above is performed every predetermined switching period Δt, chattering can be prevented. Accordingly, switching control with high stability can be performed.

The switching period Δt corresponding to the elapsed time of the switching control between the first control P1 and the second control P2 can be determined. Accordingly, the switching period Δt1 having a short period length is used at the time point of start of the overvoltage inhibition control at which the temperatures of the switching elements 31 and 32 are high. Then, when a predetermined period elapses from the start of the overvoltage inhibition control to reach a time at which the temperatures of the switching elements 31 and 32 are low, the switching period Δ t2 having a long period length is used. As a result, the number of times of switching of the switching elements 31 and 32 can be reduced as appropriate in accordance with the elapsed time of the first control P1 and the second control P2. Therefore, deterioration of the switching elements 31 and 32 due to a surge voltage at a turn-off time can be inhibited.

Moreover, the value of the current Ia that is obtained in control during normal operation of the power conversion device 100 is used also for determining the switching period Δt in the overvoltage inhibition control. Thus, it is not necessary to additionally provide a current sensor in order to determine the switching period Δt, and the existing current sensor 72 can be utilized. Accordingly, it is possible to reduce the size and the cost of the power conversion device 100.

The rotation rate N of the fan is shown in FIG. 6(c) as the cooling condition for cooling the switching elements 31 and 32, but the cooling condition is not limited thereto. For example, cooling water may be used, and in this case, the temperature, the volume, or the like of the cooling water can be used as the cooling condition.

The various conditions J1 are not limited to the operation mode of the power conversion device 100, variation of the element characteristics of the respective switching elements 31 and 32, and the position at which each of the switching elements 31 and 32 is mounted. The various conditions J1 only need to be conditions that can be accurately obtained before operation of the power conversion device 100, among the conditions that influence the temperatures of the switching elements.

The substrate 60 is shown as the heat conduction path, and the heat sink 61 is shown as the heat radiating portion, but the heat conduction path and the heat radiating portion are not limited thereto and only need to be members thermally connected to the switching elements 31 and 32.

The upper limit temperature value Tmax is a temperature for the PN junction in each of the switching elements 31 and 32, but is not limited thereto, and may be, for example, a temperature for the surface of a package for the switching elements 31 and 32.

Embodiment 2

Hereinafter, Embodiment 2 of the present invention will be described mainly regarding the differences from Embodiment 1 described above.

In Embodiment 1, the switching period Δt is determined in advance, and the control circuit 40 performs the switching control between the first control P1 and the second control P2 by using the predetermined switching period Δt.

In the present embodiment, the control circuit 40 determines a certain switching period Δt in accordance with a current Ia flowing through each phase AC input/output line during operation of the power conversion device 100.

The current Ia is the same as the current Ia described above as the condition J2 in Embodiment 1, and is obtained by the current sensor 72 during operation of the power conversion device 100 similarly to Embodiment 1.

Then, the control circuit 40 determines the switching period Δt on the basis of the current Ia and performs control while switching between the first control P1 and the second control P2 every switching period Δt.

For example, the control circuit 40 holds in advance a table indicating association between the current Ia and the switching period Δt, and determines the switching period Δt in accordance with the detected current Ia. In addition, the switching period Δt is determined such that the temperature of the PN junction in each of the switching elements 31 and 32 is equal to or lower than the upper limit temperature value Tmax.

The control circuit 40 may determine the switching period Δt in accordance with the above current Ia and an ambient temperature Ta of the switching elements 31 and 32.

The ambient temperature Ta is the same as the ambient temperature Ta described above as the condition J2 in Embodiment 1.

In addition, the control circuit 40 may determine the switching period Δt in accordance with the above current Ia and a cooling condition for cooling the switching elements 31 and 32.

The ambient temperature Ta is the same as the ambient temperature Ta described above as the condition J2 in Embodiment 1, and is the rotation rate N of the fan or the like.

Moreover, the control circuit 40 calculates a temperature rise value ΔTr of the switching elements 31 and 32 by using at least the thermal resistances of the switching elements 31 and 32 among the thermal resistances and the thermal capacities of the switching elements 31 and 32. Then, the control circuit 40 may determine the switching period Δt on the basis of the above current Ia and the calculated temperature rise value ΔTr.

Furthermore, the control circuit 40 may calculate the temperature rise value ΔTr by using the above current Ia, the thermal resistance of a heat radiating portion, and the thermal resistance of a heat conduction path.

The heat radiating portion and the heat conduction path are the same as those described above in Embodiment 1, and are the heat sink 61 and the substrate 60, or the like.

In addition, the control circuit 40 may determine the switching period Δt on the basis of the above current Ia and in accordance with the elapsed time of the switching control between the first control P1 and the second control P2.

The switching control is similar to that shown in FIG. 7 in Embodiment 1 described above, and the switching period Δt differs in accordance with the elapsed time of the switching control.

In addition, the switching period Δt may be determined by using a reference signal described below with reference to the drawing.

Figure 8:
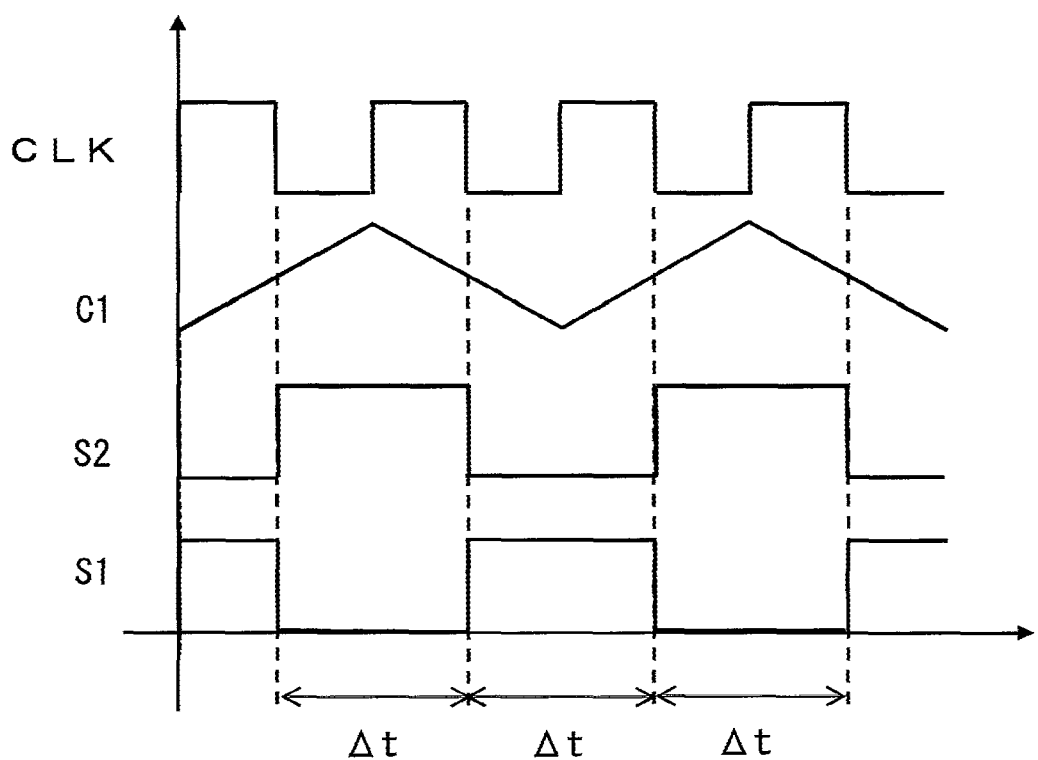
FIG. 8 is a schematic diagram showing signals for overvoltage inhibition control during regenerative control of a control circuit according to Embodiment 2 of the present invention.

FIG. 8 is a schematic diagram showing signals for overvoltage inhibition control during regenerative control of the control circuit 40 according to Embodiment 2 of the present invention.

The drawing shows a carrier C1 that is for controlling power running and regeneration of the power conversion device 100 and is a base for driving the switching elements 31 and 32. The carrier C1 is generated on the basis of a clock signal CLK as the reference signal.

In the present embodiment, on the basis of the clock signal CLK, the control circuit 40 adjusts the switching period Δt determined on the basis of the current Ia.

As shown in FIG. 8, the switching period Δt is adjusted so as to be an integral multiple of the period of the clock signal CLK, and each switching period Δt is started in synchronization with rising of the clock signal CLK.

In this manner, the clock signal CLK for generating the carrier C1 is used also for determining the switching period Δt.

According to the power conversion device of the present embodiment configured as described above, even when the path between the DC power supply 1 and the smoothing capacitor 2 is in the disconnection state during regenerative control, the control circuit 40 determines the switching period Δt on the basis of the value of the current Ia flowing through each phase AC input/output line during operation of the power conversion device 100.

In this manner, the control circuit 40 can determine a proper switching period Δt on the basis of the current Ia that can be accurately obtained and corresponds to the actual operating state.

In addition, since the control circuit 40 determines the switching period Δt, it is possible to determine the switching period Δt even during operation of the power conversion device 100. Thus, the flexibility in control improves.

Accordingly, a rise in temperature of the switching elements 31 and 32 is reliably inhibited while an increase in voltage of the smoothing capacitor 2 is inhibited, and the temperatures of the switching elements 31 and 32 can be made equal to or lower than the upper limit temperature value Tmax.

Thus, the reliability of the smoothing capacitor 2 and the switching elements 31 and 32 can be improved. Accordingly, a power conversion device having high reliability and long life can be provided. Moreover, it is possible to use small-size switching elements 31 and 32 and a small-size smoothing capacitor 2 having a small capacity, so that it is possible to reduce the size of the device configuration.

Furthermore, the control circuit 40 determines the switching period Δt on the basis of the above current Ia and also other various conditions (the ambient temperature Ta of the switching elements 31 and 32, the cooling condition for cooling the switching elements 31 and 32, the thermal resistances of the switching elements 31 and 32, the thermal capacities of the switching elements 31 and 32, the thermal resistance of the heat conduction path for the switching elements 31 and 32, and the thermal resistance of the heat radiating portion) that can be accurately obtained.

Accordingly, it is possible to determine a proper switching period Δt on the basis of various conditions that can be more accurately obtained.

Moreover, the control circuit 40 can determine the switching period Δt corresponding to the elapsed time of the switching control between the first control P1 and the second control P2. Accordingly, the number of times of switching of the switching elements 31 and 32 can be reduced as appropriate to inhibit deterioration of the switching elements 31 and 32 due to a surge voltage at a turn-off time.

Furthermore, the control circuit 40 can adjust the switching period Δt on the basis of the clock signal CLK for driving the switching elements 31 and 32 and determine the phase of the switching period Δt.

As described above, the clock signal CLK for controlling power running and regeneration of the control circuit 40 can be used also for determining the switching period Δt, and it is not necessary to newly add a reference signal. Accordingly, the load of the control operation of the control circuit 40 can be reduced.

Embodiment 3

Hereinafter, Embodiment 3 of the present invention will be described mainly regarding the differences from Embodiment 1 and Embodiment 2 described above, with reference to the drawings. The components identical or similar to those in Embodiment 1 and Embodiment 2 described above are designated by the same reference characters, and the description thereof is omitted.

Figure 9:
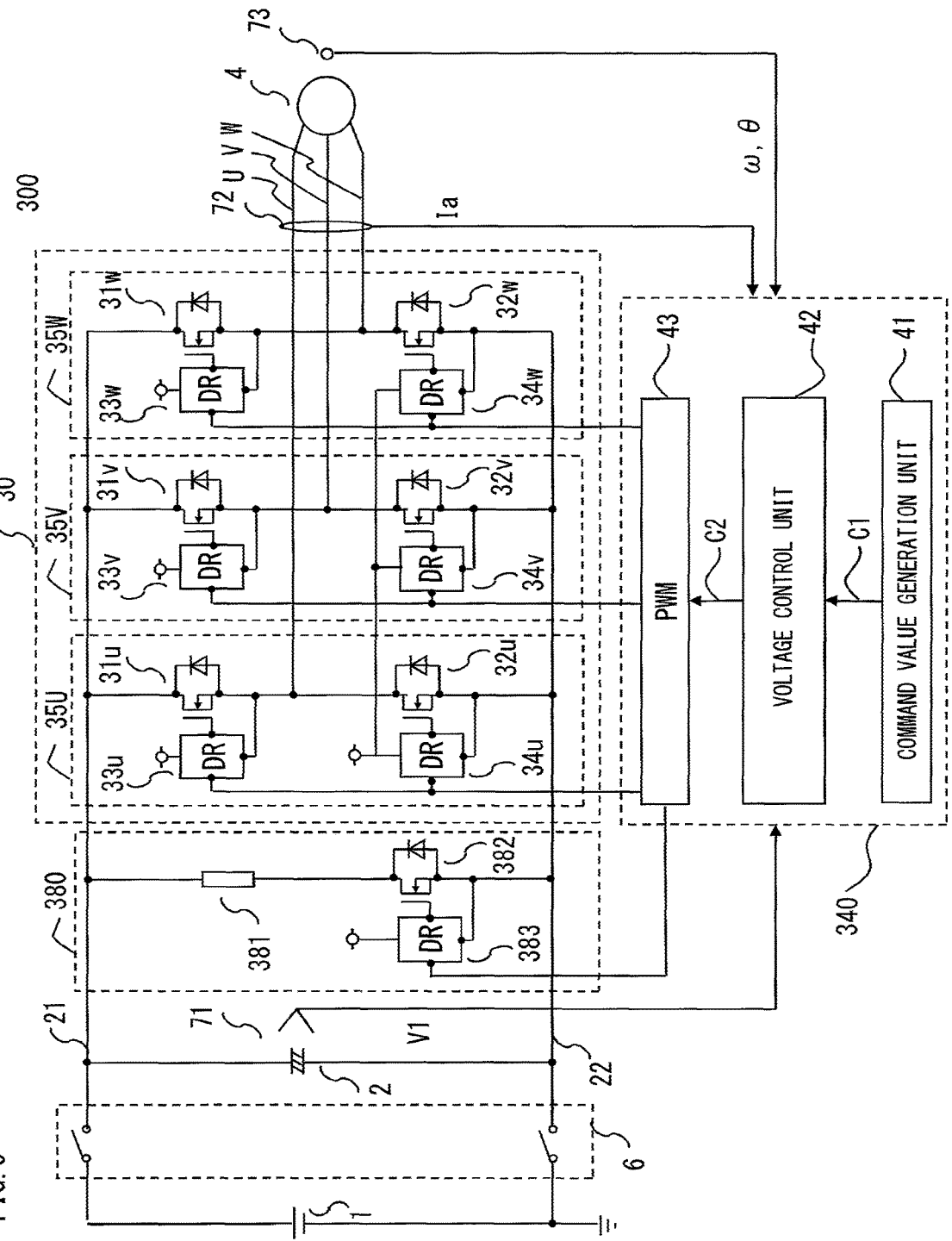
FIG. 9 is a schematic diagram showing the configuration of a power conversion device according to Embodiment 3 of the present invention.

FIG. 9 is a schematic diagram sowing the configuration of a power conversion device 300 according to Embodiment 3 of the present invention.

As shown in the drawing, in the present embodiment, a discharge circuit 380 for discharging the smoothing capacitor 2 is connected in parallel to the smoothing capacitor 2. The discharge circuit 380 includes a resistor 381, a switching element 382, and a drive circuit 383 for driving the switching element 382.

FIG. 10 is a schematic diagram showing signals for overvoltage inhibition control during regenerative control of a control circuit 340 according to Embodiment 3 of the present invention. The horizontal axis indicates time, and Q indicates a period of the overvoltage inhibition control.

The drawing shows the relationship among: a Fail signal F1 that becomes ON when the path between the DC power supply 1 and the smoothing capacitor 2 comes into the disconnection state; drive signals S2 and S1 for the lower switching elements 32U, 32V, and 32W and the upper switching elements 31U, 31V, and 31W which are outputted to the electric motor drive device 30 by the PWM circuit 43 of the control circuit 340 during the overvoltage inhibition control; and a drive signal S3 for the discharge circuit 380 during the overvoltage inhibition control.

Similarly to Embodiment 1, when the Fail signal F1 becomes Hi at time t0 during regenerative control of the electric motor drive device 30, the control circuit 340 starts the overvoltage inhibition control. Then, the control circuit 340 performs the second control P2 having a zero vector period in which all the lower switching elements 32U, 32V, and 32W of the U phase, the V phase, and the W phase are turned on and all the upper switching elements 31U, 31V, and 31W are turned off.

At time t1 at which a period Δt elapses from time to, the control circuit 340 turns off the lower switching elements 32U, 32V, and 32W and the upper switching elements 31U, 31V, and 31W and also turns on the switching element 382 within the discharge circuit 380. At this time, since the upper switching elements 31U, 31V, and 31W and the lower switching elements 32U, 32V, and 32W are OFF, regenerative power is stored into the smoothing capacitor 2. At this time, the switching element 382 within the discharge circuit 380 is turned on. Thus, the power to be stored into the smoothing capacitor 2 is consumed by the resistor 381, and an increase in voltage of the smoothing capacitor 2 is inhibited.

At time t2 at which a predetermined period elapses from time t1, the control circuit 40 switches from the control in which the switching element 382 within the discharge circuit 380 is turned on, to the first control P1 having a zero vector period in which all the upper switching elements 31U, 31V, and 31W of the U phase, the V phase, and the W phase are turned on and all the lower switching elements 32U, 32V, and 32W are turned off.

Next, at time t3 at which the period Δt elapses from time t2, the control circuit 40 switches to the second control P2. A control state at time t3 is the same as a control state at time to, and the same control operation as that from time t0 to time t2 described above is repeated after time t3 until the Fail signal F1 becomes Low.

As described above, the control circuit 40 performs control while switching between the first control P1 and the second control P2 every switching period Δt, and performs discharge control P3 during switching from the second control P2 to the first control P1.

The switching period Δt used in the present embodiment may be a predetermined switching period Δt as described above in Embodiment 1, or may be a switching period Δt determined by the control circuit 40 as described above in Embodiment 2.

According to the power conversion device 300 of the present embodiment configured as described above, the same advantageous effects as those in Embodiment 1 described above are achieved, and even when the path between the DC power supply 1 and the smoothing capacitor 2 is in the disconnection state during regenerative control, a rise in temperature of the switching elements 31 and 32 can be reliably inhibited while an increase in voltage of the smoothing capacitor 2 is inhibited. Thus, the reliability of the smoothing capacitor 2 and the switching elements 31 and 32 can be improved. Accordingly, a power conversion device having high reliability and long life can be provided. Moreover, it is possible to use small-size switching elements 31 and 32 and a small-size smoothing capacitor 2 having a small capacity, so that it is possible to reduce the size of the device configuration.

Furthermore, the provision of the discharge circuit 380 provides a configuration in which the regenerative power can be consumed not only within the electric motor drive device 30 but also by the resistor 381 of the discharge circuit 380. Then, control in which the upper switching elements 31U, 31V, and 31W and the lower switching elements 32U, 32V, and 32W are turned off and the regenerative power is consumed by the discharge circuit 380, is provided between the first control P1 and the second control P2. Thus, a longer cooling period can be ensured in which a regenerative current is not caused to flow to the switching elements 31 and 32 while an increase in voltage of the smoothing capacitor 2 is inhibited. Accordingly, the effect of improving the reliability of the switching elements 31 and 32 is further enhanced.

In the present embodiment, the control in which the smoothing capacitor 2 is discharged by the discharge circuit 380 is provided during switching from the second control P2 to the first control P1, but the present invention is not limited to this order. The control in which the smoothing capacitor 2 is discharged by the discharge circuit 380 may be provided during switching from the first control P1 to the second control P2.

In addition, means for determining whether the voltage V1 of the smoothing capacitor 2 is equal to or higher than a predetermined voltage Vs may be provided to the control circuit 340, and control may be performed such that the switching element 382 is turned on to discharge the smoothing capacitor 2 only when the voltage Vdc of the smoothing capacitor 2 is equal to or higher than the voltage Vs. Accordingly, control corresponding to the actual voltage Vdc of the smoothing capacitor 2 is enabled.

In addition, the configuration of the discharge circuit 380 described above is an example, and the configuration of the discharge circuit 380 is not limited to the described configuration, and only needs to be a circuit configuration in which a switching element capable of switching between ON and OFF of a path through which a regenerative current flows is included, and regenerative power can be consumed.

In the present embodiment, control is performed while switching between the first control P1 and the second control P2 every predetermined fixed switching period Δt, but the present invention is not limited thereto. For example, a period in which the first control P1 is performed and a switching period Δt in which the second control P2 is performed may be set so as to be different from each other.

In addition, a period in which the discharge circuit 380 is used may be set so as to be different from the switching period Δt.

Such a method for driving the switching elements is an example. The switching elements 31 and 32 only need to be controlled by using temperature information such that a decrease in reliability of the electric motor drive device 30 and the switching elements 31 and 32 is inhibited.

In addition, the power conversion device described above in each of Embodiments 1 to 3 is not limited to a device used for driving an electric motor of an electric vehicle, and also the electric motor 4 is not limited to an electric motor used in an electric vehicle.

It is noted that, within the scope of the present invention, the respective embodiments may be freely combined with each other, or each of the respective embodiments may be modified or simplified as appropriate.

The invention claimed is:

1. A power conversion device comprising:
a smoothing capacitor connected between DC buses and smoothing DC power from a DC power supply;
an inverter circuit including series units including upper switching elements connected to a high potential side of the DC buses and lower switching elements connected to a low potential side of the DC buses, the upper switching elements being connected in series with the lower switching elements, respectively, connection points between the upper switching elements and the lower switching elements being connected to respective phase AC input/output lines, the respective series units being connected in parallel between the DC buses, the inverter circuit converting the DC power to AC power and outputting the AC power; and
a control circuit controlling power running and regeneration of the inverter circuit, wherein
during regenerative control of the inverter circuit, when a path between the DC power supply and the smoothing capacitor is in a disconnection state, the control circuit performs control while switching between first control in which all the upper switching elements are turned on and all the lower switching elements are turned off and second control in which all the lower switching element are turned on and all the upper switching elements are turned off, every predetermined switching period,
wherein
the control circuit holds a plurality of different period lengths for the switching period, and
one period length is selected from the plurality of period lengths in accordance with at least one of a current flowing through each phase AC input/output line, an ambient temperature of the upper switching elements and the lower switching elements, and a condition for cooling the upper switching elements and the lower switching elements, and is used for the switching period.

2. The power conversion device according to claim 1, wherein the switching period is determined such that temperatures of the upper switching elements and the lower switching elements are equal to or lower than an upper limit temperature value.

3. The power conversion device according to claim 1, wherein the control circuit determines that the path is in the disconnection state, when a voltage between the DC buses becomes equal to or higher than a predetermined voltage value during regenerative control of the inverter circuit.

4. The power conversion device according to claim 1, wherein the upper switching elements and the lower switching elements are unipolar devices.

5. The power conversion device according to claim 1, wherein the upper switching elements and the lower switching elements are bipolar devices.

6. The power conversion device according to claim 1, further comprising a discharge circuit including a switching element and connected in parallel to the smoothing capacitor, wherein
the control circuit provides discharge control in which the upper switching elements and the lower switching elements are turned off and the switching element within the discharge circuit is turned on, between the first control and the second control.

7. A power conversion device comprising:
a smoothing capacitor connected between DC buses and smoothing DC power from a DC power supply;
an inverter circuit including series units including upper switching elements connected to a high potential side of the DC buses and lower switching elements connected to a low potential side of the DC buses, the upper switching elements being connected in series with the lower switching elements, respectively, connection points between the upper switching elements and the lower switching elements being connected to respective phase AC input/output lines, the respective series units being connected in parallel between the DC buses, the inverter circuit converting the DC power to AC power and outputting the AC power; and
a control circuit controlling power running and regeneration of the inverter circuit, wherein
during regenerative control of the inverter circuit, when a path between the DC power supply and the smoothing capacitor is in a disconnection state, the control circuit performs control while switching between first control in which all the upper switching elements are turned on and all the lower switching elements are turned off and second control in which all the lower switching element are turned on and all the upper switching elements are turned off, every determined switching period, and
the control circuit determines the switching period in accordance with a current flowing through each phase AC input/output line.

8. The power conversion device according to claim 7, wherein the control circuit determines the switching period such that temperatures of the upper switching elements and the lower switching elements are equal to or lower than an upper limit temperature value.

9. The power conversion device according to claim 8, further comprising a discharge circuit including a switching element and connected in parallel to the smoothing capacitor, wherein
the control circuit provides discharge control in which the upper switching elements and the lower switching elements are turned off and the switching element within the discharge circuit is turned on, between the first control and the second control.

10. The power conversion device according to claim 8, wherein the control circuit determines the switching period in accordance with an ambient temperature of the upper switching elements and the lower switching elements.

11. The power conversion device according to claim 7, wherein the control circuit determines the switching period in accordance with an ambient temperature of the upper switching elements and the lower switching elements.

12. The power conversion device according to claim 7, wherein the control circuit determines the switching period in accordance with a cooling condition for cooling the upper switching elements and the lower switching elements.

13. The power conversion device according to claim 7, wherein
a temperature rise value of the upper switching elements and the lower switching elements is calculated in advance by using at least thermal resistances of the upper switching elements and the lower switching elements among the thermal resistances and thermal capacities of the upper switching elements and the lower switching elements, and
the control circuit determines the switching period on the basis of the temperature rise value.

14. The power conversion device according to claim 13, wherein heat generated by the upper switching elements and the lower switching elements is transmitted to a heat radiating portion via a heat conduction path, and the temperature rise value is calculated by using a thermal resistance of the heat radiating portion and a thermal resistance of the heat conduction path.

15. The power conversion device according to claim 7, wherein the control circuit determines the switching period in accordance with an elapsed time of switching control between the first control and the second control.

16. The power conversion device according to claim 7, wherein the control circuit adjusts the switching period on the basis of a reference signal for generating a carrier to be used for controlling drive of the upper switching elements and the lower switching elements.

17. The power conversion device according to claim 7, further comprising a discharge circuit including a switching element and connected in parallel to the smoothing capacitor, wherein
the control circuit provides discharge control in which the upper switching elements and the lower switching elements are turned off and the switching element within the discharge circuit is turned on, between the first control and the second control.

18. A power conversion device comprising:
a smoothing capacitor connected between DC buses and smoothing DC power from a DC power supply;
an inverter circuit including series units including upper switching elements connected to a high potential side of the DC buses and lower switching elements connected to a low potential side of the DC buses, the upper switching elements being connected in series with the lower switching elements, respectively, connection points between the upper switching elements and the lower switching elements being connected to respective phase AC input/output lines, the respective series units being connected in parallel between the DC buses, the inverter circuit converting the DC power to AC power and outputting the AC power; and
a control circuit controlling power running and regeneration of the inverter circuit, wherein
during regenerative control of the inverter circuit, when a path between the DC power supply and the smoothing capacitor is in a disconnection state, the control circuit performs control while switching between first control in which all the upper switching elements are turned on and all the lower switching elements are turned off and second control in which all the lower switching element are turned on and all the upper switching elements are turned off, every predetermined switching period,
wherein the switching period is determined in accordance with an elapsed time of switching control between the first control and the second control.

* * * * *